(12) United States Patent
Taarud et al.

(10) Patent No.: US 6,999,534 B2
(45) Date of Patent: Feb. 14, 2006

(54) METHOD FOR MITIGATING DC OFFSET IN A SIGN BIT CORRELATOR

(75) Inventors: Jeff E. Taarud, Cardiff-by-the-Sea, CA (US); Richard G. C. Williams, San Diego, CA (US); G. Layne Lisenbee, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 765 days.

(21) Appl. No.: 10/210,701

(22) Filed: Jul. 31, 2002

(65) Prior Publication Data

US 2004/0022331 A1 Feb. 5, 2004

(51) Int. Cl.
*H04L 27/06* (2006.01)
(52) U.S. Cl. ..................... 375/343; 375/346
(58) Field of Classification Search ............ 375/130, 375/142–145, 148–153, 316, 340–343, 346, 375/350, 354, 363, 364–368; 708/250, 422
See application file for complete search history.

(56) References Cited

U.S. PATENT DOCUMENTS

| | | | | |
|---|---|---|---|---|
| 4,379,284 A | * | 4/1983 | Boykin | 375/329 |
| 5,410,368 A | * | 4/1995 | Krishnamurthy et al. | 348/726 |
| 5,448,571 A | * | 9/1995 | Hong et al. | 370/514 |
| 5,757,848 A | * | 5/1998 | Hogberg | 375/150 |
| 5,793,548 A | * | 8/1998 | Zook | 360/51 |

* cited by examiner

*Primary Examiner*—Don N. Vo
(74) *Attorney, Agent, or Firm*—Abdul Zindani; W. James Brady, III; Frederick J. Telecky, Jr.

(57) ABSTRACT

A method 10 is provided to mitigate DC offset in a sign bit correlator associated with a packet detection circuit. The input sign pattern is monitored; and if a long run of the same sign is seen, a sign bit is replaced with a bit generated using a desired pseudorandom noise (PN) sequence. This ensures that the correlator only reacts substantially to correlations that are not due to DC offset.

14 Claims, 1 Drawing Sheet

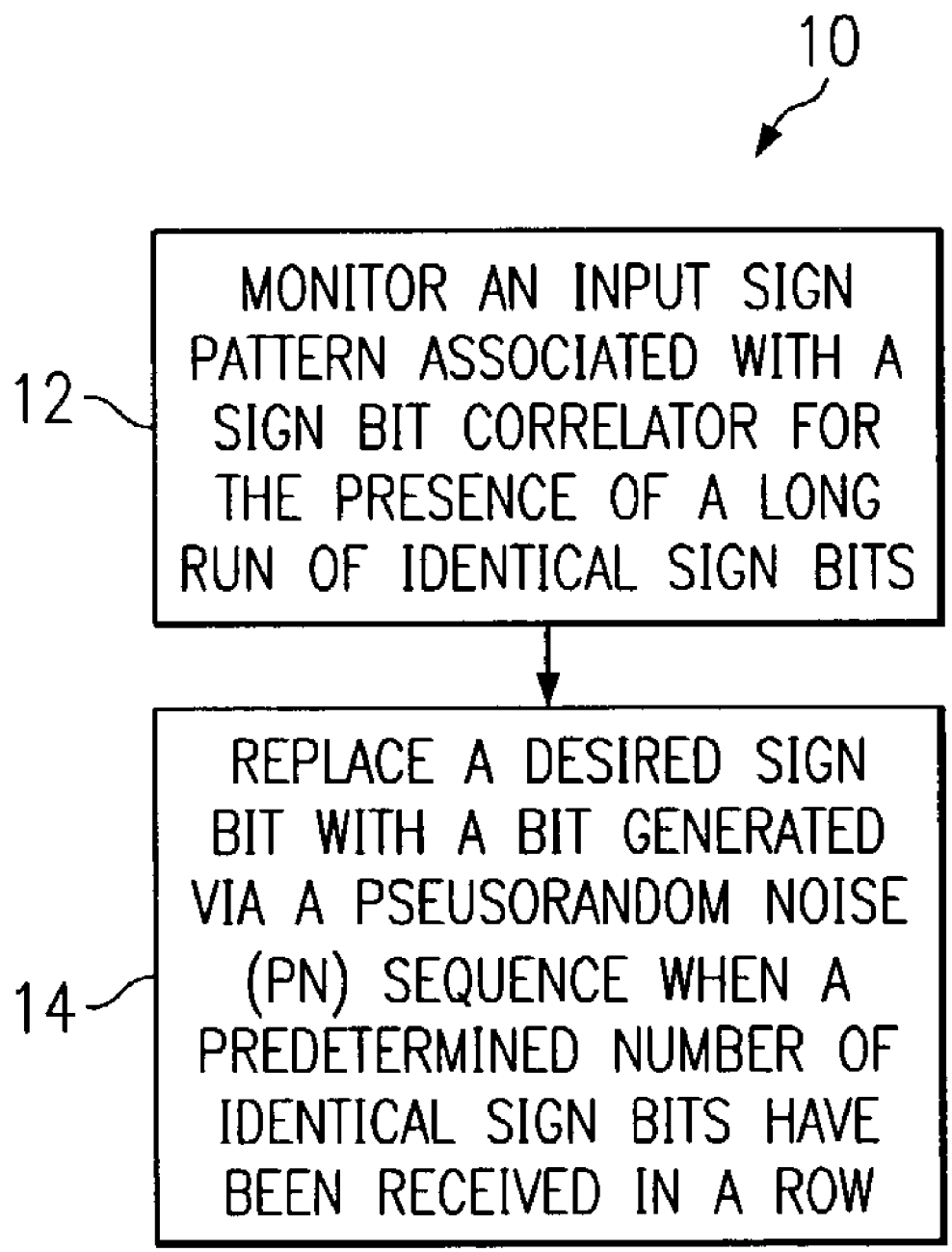

METHOD FOR MITIGATING DC OFFSET IN A SIGN BIT CORRELATOR

BACKGROUND OF THE INVENTION

1. Field of the Invention

This invention relates generally to packet detection circuits, and more particularly to a method for mitigating DC offset in a sign bit correlator.

2. Description of the Prior Art

The packet detection circuit for a communication device that operates in accordance with the IEEE 802.11a protocol, among others, is most simply implemented as a sign bit correlator. A sign bit correlator is problematic however, in that such correlators have an inherent weakness to DC offset that can create unwanted correlations.

It is therefore advantageous and desirable to provide a technique of implementing sign bit correlation such that a desired sign bit correlator will mitigate against reacting to correlations that are caused by a DC offset.

SUMMARY OF THE INVENTION

The present invention is directed to a method of implementing sign bit correlation such that a desired sign bit correlator will mitigate against reacting to correlations that are caused by a DC offset.

According to one embodiment, a method of mitigating DC offset in a sign bit correlator comprises the steps of: monitoring an input sign pattern for a long run of identical sign bits; and replacing a desired sign bit selected from the long run of identical sign bits with a replacement bit generated via a pseudorandom noise (PN) sequence when a predetermined number of identical sign bits have been received in a row.

According to another embodiment, a method of mitigating DC offset in a sign bit correlator comprises the steps of: monitoring an input sign pattern for a long run of identical sign bits; and replacing a desired sign bit selected from the long run of identical sign bits with a replacement bit generated via a predetermined parameter combination when a predetermined number of identical sign bits have been received in a row.

According to yet another embodiment, a method of mitigating DC offset in a sign bit correlator comprises the steps of: monitoring an input signal sign pattern for a long run of identical sign bits; and inserting a random sign bit in the position of a desired sign bit in time among the long run of identical sign bits when a predetermined number of identical sign bits have been received in a row.

The method for mitigating DC offset in a sign bit correlator may employ a pseudorandom noise (PN) sequence generated by any desired parameter combination. One such combination may be defined, for example, by the relationship $1+x+x^7$, where x is a delay operator.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawing wherein:

The FIGURE is a flowchart depicting a method of mitigating DC offset in a sign bit correlator according to one embodiment of the present invention.

While the above-identified drawing FIGURE sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

A packet detection circuit for use with a device that operates using the IEEE 802.11a standard protocol and/or using the emerging 80.11 g standard protocol is most simply implemented as a sign bit correlator. Use of a sign bit correlator is problematic, as stated herein before however, in that a sign bit correlator has an inherent weakness to DC offset that will generate correlations. One packet correlation structure and associated method of detecting the occurrence of a boundary between sequences in a digital sample stream is disclosed in pending U.S. patent application Ser. No. 09/996,197, entitled *Boundary Detection Using Multiple Correlations*, docket number TI-33211, filed on Nov. 28, 2001 by Srikanth Gummadi and Richard G. Williams, and assigned to TEXAS INSTRUMENTS INCORPORATED, the assignee of the present patent application, and is incorporated by reference herein in its entirety.

Correlation methods and associated structures that rely solely on sign bits can erroneously detect a strong correlation when no packet is present if the DC offset of the incoming signal is greater than the noise level. These systems rely on the noise entering the correlation structure to have varying signs which are uncorrelated; and so the detection does not trigger. It is noted that if one considers adding a large offset to a set of small numbers that vary around level zero, the result is a set of numbers that are all on the same side of zero; so they all have the same sign. This situation then will falsely trigger the correlation detector.

The illustrated FIGURE is a flow chart depicting a method 10 for mitigating DC offset in a sign bit correlator according to one embodiment of the present invention. The method 10 shown in the FIGURE can be seen to begin in block 12 by monitoring the sign bit correlator input sign pattern to determine the presence of a long run of the same sign. The number of the same sign bits in a row that is used as a triggering mechanism is, of course, dependent upon the particular parameters desired for detection. This number obviously must be greater than any such number that one would expect to find in a genuine detection condition; or else the true detection performance of the method will be degraded. The number must also be less than any number that will significantly add to the correlation output. This number then is variable, and is chosen according to the conditions associated with the relevant communication structure and method. The present inventors found one embodiment using 16 identical sign bits in a row was sufficient to provide a working structure and method for mitigating DC offset in a sign bit correlator associated with the IEEE 802.11a communication protocol. Method 10 then replaces a sign bit with a bit generated via a predetermined pseudorandom noise (PN) sequence if such a long run of the same sign occurs as shown in block 14. Specifically, one embodiment looks for 16 sign bits in a row to be equal, as stated herein above. Upon the occurrence of 16 identical sign bits in a row, a random sign bit is then inserted in the position of the earliest sign bit of the 16 in time. One pseudo code (algorithmic software) that implements insertion of a random sign bit in the position of the earliest sign bit of the 16 sign bits in time can be written as:
1. set L equal to the length of delay_line
2. for loop=1 to (L−1)
3. set delay_line(loop) equal to delay_line(loop+1)
4. end
5. set delay_line(L) equal to input
6. set flag equal to 0
7. for loop=1 to 15
8. if delay_line(L-loop) doesn't equal input then set flag equal to 1
9. end
10. if flag equals 0 then set delay_line(L−15) equal to random bit The random bit, according to one embodiment, is generated from a simple pseudorandom noise generator circuit. Such noise generators are often represented as a polynomial such as, for example, $x^7+x+1$, where x is a delay operator. The polynomial represented as $x^7+x+1$ can, for example, then be implemented via a delay line consisting of 7 delay elements. The output of the PN generator circuit represented by the polynomial $x^7+x+1$ is a 1 that is xor'd with the first element of the delay line and the $7^{th}$ element of the delay line. This bit (output) is fed into the first element of the 7 delay elements comprising the delay line, while the remaining bits are shifted along by one until the $7^{th}$ element bit falls off the end. This particular structure is based on a primitive polynomial. A primitive polynomial ensures that the period of the pattern that is produced is as long as possible given the number of delay elements that are used. This is a desirable feature since it means that a sequence with a long period can be produced as efficiently as possible. In the present embodiment, this structure is only run when it is desired to generate a new random bit for insertion into the correlation structure such as the 16-bit structure discussed herein before.

The present invention is not so limited however, and it shall be understood that any other PN generator will suffice to provide the requisite random bit so long as the output does not trigger a packet detection independently. If for example, the input to the correlation structure consisted entirely of pure DC, the input to the correlation structure would be the PN sequence apart from the leading unaltered sign bits. If this pattern triggered the correlation, then that would be particularly useless. It can also be appreciated that PN generators that have smaller periods may also trigger the correlation structure, depending on the period being searched for.

The present inventors found the PN structure discussed above suitable to prevent unwanted correlations in a sign bit correlator because it is simple to implement; and it generates a sufficiently long pseudorandom sequence. Specifically, the PN structure generates a sequence of 127 numbers before it repeats; and the correlation period is 64.

In summary explanation, method 10 ensures that a sign bit correlator will react substantially only to correlations that are not caused by a DC offset. Although a particular embodiment has been described using a particular PN sequence, the present invention is not so limited; and it shall be understood that a vast number of other parameter combinations may be employed to produce the desired results when implemented according to the inventive principles described herein before.

In view of the above, it can be seen the present invention presents a significant advancement in the art of sign bit correlator techniques. Further, this invention has been described in considerable detail in order to provide those skilled in the packet detection art with the information needed to apply the novel principles and to construct and use such specialized components as are required.

Further, in view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of mitigating DC offset in a sign bit correlator, the method comprising the steps of:
    monitoring an input sign pattern for a long run of identical sign bits; and
    replacing a desired sign bit selected from the long run of identical sign bits with a replacement bit generated via a pseudorandom noise (PN) sequence when a predetermined number of identical sign bits have been received in a row.

2. The method according to claim 1 wherein the PN sequence is defined according to the relationship $1+x+x^7$, wherein x is a delay operator.

3. The method according to claim 1, wherein the PN sequence is defined according to a relationship comprising a plurality of delay operators.

4. The method according to claim 1, wherein the PN sequence is defined according to a relationship comprising a plurality of delay operators based upon a primitive polynomial.

5. A method of mitigating DC offset in a sign bit correlator, the method comprising the steps of:
    monitoring an input sign pattern for a long run of identical sign bits; and
    replacing a desired sign bit selected from the long run of identical sign bits with a replacement bit generated via a predetermined parameter combination when a predetermined number of identical sign bits have been received in a row.

6. The method according to claim 5 wherein the predetermined parameter combination is a pseudo noise (PN) sequence.

7. The method according to claim 6 wherein the PN sequence is defined according to the relationship $1+x+x^7$, wherein x is a delay operator.

8. The method according to claim 6, wherein the PN sequence is defined according to a relationship comprising a plurality of delay operators.

9. The method according to claim 6, wherein the PN sequence is defined according to a relationship comprising a plurality of delay operators based upon a primitive polynomial.

10. A method of mitigating DC offset in a sign bit correlator, the method comprising the steps of:
    monitoring an input signal sign pattern for a long run of identical sign bits; and
    inserting a random sign bit in the position of a desired sign bit in time among the long run of identical sign bits when a predetermined number of identical sign bits have been received in a row.

11. The method according to claim 10, further comprising the step of generating the random sign bit according to a pseudorandom noise (PN) sequence.

12. The method according to claim 11, wherein the PN sequence is defined according to a relationship comprising a plurality of delay operators.

13. The method according to claim 11, wherein the PN sequence is defined according to a relationship comprising a plurality of delay operators based upon a primitive polynomial.

14. The method according to claim 10, wherein the step of inserting a random sign bit in the position of a desired sign bit in time comprises inserting a random sign bit in the position of the earliest sign bit in time.

* * * * *